(No Model.)
C. RUPPRECHT.
TONGUE SUPPORT.
No. 360,394. Patented Mar. 29, 1887.
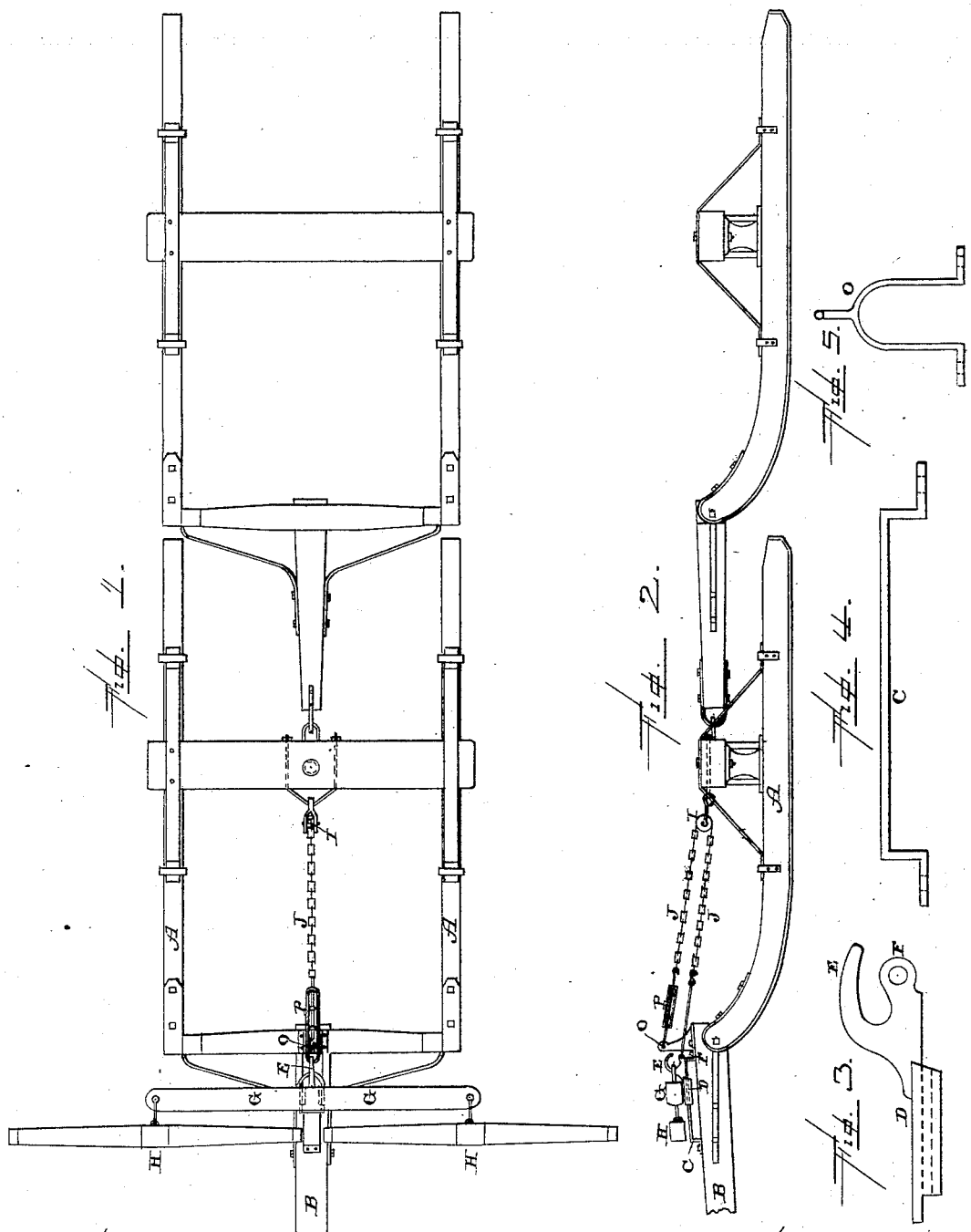

UNITED STATES PATENT OFFICE.

CHARLES RUPPRECHT, OF CALUMET, MICHIGAN.

TONGUE-SUPPORT.

SPECIFICATION forming part of Letters Patent No. 360,394, dated March 29, 1887.

Application filed February 2, 1887. Serial No. 226,302. (No model.)

*To all whom it may concern:*

Be it known that I, CHARLES RUPPRECHT, of Calumet, in the county of Houghton and State of Michigan, have invented certain new and useful Improvements in Tongue-Supports; and I do hereby declare the following to be a full, clear, and exact description of the invention, such as will enable others skilled in the art to which it pertains to make and use it, reference being had to the accompanying drawings, which form part of this specification.

My invention relates to an improvement in tongue-supports; and it consists in the combination of a stationary guide which is secured upon the top of the rear end of the tongue, a sliding hook which moves back and forth upon this guide, a draft-chain, a pulley for changing the direction of the draft, an adjusting device connected to the chain, and an arm which is rigidly secured to the rear end of the tongue, and to which the front end of the chain is fastened, as will be more fully described hereinafter.

The object of my invention is to provide an attachment for sleighs by means of which the forward draft of the animals will cause the front end of the tongue to be raised upward to such an extent as to take its weight from the animals, but which, when the animals are holding back, as when going down hill, will allow the front end of the tongue to drop, so as to enable the animals to guide the sleigh, and at the same time pull the single-trees back from their legs.

Figure 1 is a plan view of a sleigh embodying my invention. Fig. 2 is a side elevation of the same. Figs. 3, 4, and 5 are detail views of the same.

A represents a sled or sleigh of any suitable description, and B the tongue, which is pivoted thereto in the usual manner. Rigidly secured upon the top of the tongue, near its rear end, is the guide C, which is shaped as shown in Fig. 4, and which will be of any desired length. Placed upon this guide, and moving back and forth thereon, is the slide D, which has a hook, E, and a perforated arm, F, formed upon its rear end, as shown in Fig. 3. This slide D moves back and forth upon the guide C from one end to the other, according as the team is drawing or holding back. The double-tree G is fastened to the hook E, and to the double-tree are secured the usual single-trees, H. When the team is drawing the sleigh, the single-trees and double-tree draw the slide D forward upon the guide C until the front end of the slide strikes against the front end of the guide. When the animals are holding back, this slide is drawn backward by means of the chain J, which is fastened to the perforated arm F, to the rear end of the guide, thus drawing the single-trees back, so as not to strike the horses upon their legs. The chain J is fastened at its front end to the arm F, passes back around the pulley I for the purpose of changing the direction of the draft, and is fastened at its front end to the arm O, which projects upward from the top of the rear end of the tongue. In order to regulate the length of the chain J, a swivel, P, is used, so as to regulate the distance the slide D shall move and at what points it shall stop. The arm O is shaped as shown in Fig. 5, so as to allow the front end of the chain to pass through it.

While the animals are pulling, the single and double trees are moved forward, carrying the slide D to the front end of the guide C, thus causing the chain I to exert a pull upon the arm O on the rear end of the tongue. This pull upon the arm O causes the front end of the tongue to be raised upward to such an extent as to take its weight from the animals. When going down hill, while the animals are holding back, the chain becomes slackened, and the weight of the front end of the tongue causes it to drop downward, thereby causing the draft upon the chain I to be divided between the arms O and the hook D. In proportion as the front end of the tongue drops downward, the arm O causes a pull upon the slide D for the purpose of moving the single and double trees backward to the rear end of the guide C. When the front end of the tongue drops downward, the animals can guide the sleigh perfectly in all of its movements.

Having thus described my invention, I claim—

1. The combination of the stationary guide secured to the tongue, a slide placed thereon and having connected to it the double-tree and the draft-chain, the pulley for changing the direction of the draft-chain, and an arm secured to the rear end of the tongue, substantially as shown.

2. The combination of the sleigh or other vehicle, the tongue B, the stationary guide rigidly secured upon the top of the tongue, the slide D, provided with the hook E, an arm, F, the chain J, the pulley I, an adjusting device, P, and the arm O, secured to the rear end of the tongue, substantially as shown and described.

In testimony whereof I affix my signature in presence of two witnesses.

CHARLES RUPPRECHT.

Witnesses:
FRED. MACKENZIE,
JAMES RAMSAY.